(12) United States Patent
Park et al.

(10) Patent No.: US 10,877,310 B2
(45) Date of Patent: Dec. 29, 2020

(54) TRANSPARENT DISPLAY APPARATUS

(71) Applicant: LG DISPLAY CO., LTD., Seoul (KR)

(72) Inventors: Ju-Seong Park, Goyang-si (KR);
Sung-Min Jung, Seoul (KR);
Sung-Woo Kim, Seoul (KR);
Keong-Jin Lee, Seoul (KR);
Myung-Soo Park, Gimpo-si (KR)

(73) Assignee: LG DISPLAY CO., LTD., Seoul (KR)

( * ) Notice: Subject to any disclaimer, the term of this patent is extended or adjusted under 35 U.S.C. 154(b) by 27 days.

(21) Appl. No.: 16/208,397

(22) Filed: Dec. 3, 2018

(65) Prior Publication Data

US 2019/0204676 A1 Jul. 4, 2019

(30) Foreign Application Priority Data

Dec. 29, 2017 (KR) .................. 10-2017-0183925

(51) Int. Cl.

| G02F 1/1335 | (2006.01) |
|---|---|
| G02B 25/00 | (2006.01) |
| G02B 27/09 | (2006.01) |
| G02B 30/24 | (2020.01) |
| G02B 30/25 | (2020.01) |
| G02B 30/26 | (2020.01) |

(52) U.S. Cl.
CPC ..... *G02F 1/133528* (2013.01); *G02B 25/001* (2013.01); *G02B 27/0955* (2013.01); *G02B 30/24* (2020.01); *G02B 30/25* (2020.01); *G02B 30/26* (2020.01)

(58) Field of Classification Search
CPC ........ G02B 30/24; G02B 30/26; G02B 30/25; G02F 1/133528; H04N 13/361; G09G 2320/068
See application file for complete search history.

(56) References Cited

U.S. PATENT DOCUMENTS

| 8,823,889 | B2 * | 9/2014 | Chen ................... G02F 1/13471 |
|---|---|---|---|
| | | | 349/15 |
| 2006/0256259 | A1 * | 11/2006 | Takagi ................... G02B 30/27 |
| | | | 349/95 |
| 2010/0073347 | A1 * | 3/2010 | Takagi ................. H04N 13/398 |
| | | | 345/211 |
| 2011/0194063 | A1 * | 8/2011 | Lee ....................... G02F 1/1333 |
| | | | 349/153 |

(Continued)

FOREIGN PATENT DOCUMENTS

| CN | 102749717 A | 10/2012 |
|---|---|---|
| CN | 104714262 A | 6/2015 |

OTHER PUBLICATIONS

Chinese Office Action dated Oct. 27, 2020 issued in Patent Application No. 201811445388.0 w/English Translation (16 pages).

*Primary Examiner* — Jia X Pan
(74) *Attorney, Agent, or Firm* — Polsinelli PC (57) ABSTRACT

A transparent display apparatus is provided. The transparent display apparatus may include a display panel realizing an image. The image realized by the display panel may display on an image formed by light passing through the display panel. In the transparent display apparatus, the moving path of light emitted from the display panel may longer than the moving path of light passing through the display panel, so that the quality and the viewing angle of the image realized by the display panel may be improved.

18 Claims, 8 Drawing Sheets

(56) References Cited

U.S. PATENT DOCUMENTS

| | | | |
|---|---|---|---|
| 2013/0208196 A1* | 8/2013 | Kim | G02B 30/26 349/15 |
| 2014/0028933 A1* | 1/2014 | Chen | H04N 13/305 349/15 |
| 2014/0055854 A1* | 2/2014 | Arakawa | G02B 30/25 359/462 |
| 2014/0375706 A1* | 12/2014 | Lee | G09G 3/003 345/697 |
| 2015/0177549 A1* | 6/2015 | An | G02F 1/13338 349/12 |
| 2018/0026082 A1* | 1/2018 | Lee | G02F 1/134309 349/96 |

\* cited by examiner

TRANSPARENT DISPLAY APPARATUS

CROSS-REFERENCE TO RELATED APPLICATION

This application claims the priority benefit of Korean Patent Application No. 10-2017-0183925, filed on Dec. 29, 2017, which is hereby incorporated by reference in its entirety as if fully set forth herein.

BACKGROUND

Field of the Disclosure

The present disclosure relates to a transparent display apparatus in which an image realized by a display panel displays on an image formed by light passing through the display panel.

Description of the Background

Generally, a display apparatus includes a display panel which realizes an image. For example, the display apparatus may include a liquid crystal panel having a liquid crystal, and/or an OLED panel having an organic light-emitting element.

In the display apparatus, light moving toward the display panel may pass through the display panel. For example, in the display apparatus, an image realized by the display panel may display on an image formed by light passing through the display panel. The display apparatus may be mounted to user in a manner such as head-gear. For example, in the display apparatus, the path of the light passing through the display panel may be the same as the path of the light emitted from the display panel.

The display panel may realize a stereoscopic image. For example, the display apparatus may be a transparent display apparatus realizing an image for augmented reality (AR). However, since the display panel is disclosed too close to the user, the transparent display apparatus may not sufficiently secure a path of the light emitted from the display panel. Thus, in the transparent display apparatus, the quality of the image realized by the display panel may be decreased, and the viewing angle may be reduced.

SUMMARY OF THE DISCLOSURE

Accordingly, the present disclosure is directed to a transparent display apparatus that substantially obviates one or more problems due to limitations and disadvantages of the related art.

In addition, the present disclosure is to provide a transparent display apparatus capable of increasing the quality of the image which is realized by a display panel, and displayed on an image formed by light passing through the display panel.

Further, the present disclosure is to provide a transparent display apparatus in which light emitted from a display panel has a path longer than light passing through the display panel.

Additional advantages and features of the disclosure will be set forth in part in the description which follows and in part will become apparent to those having ordinary skill in the art upon examination of the following or may be learned from practice of the disclosure. Other advantages of the disclosure may be realized and attained by the structure particularly pointed out in the written description and claims hereof as well as the appended drawings.

To achieve these and other advantages and in accordance with the purpose of the disclosure, as embodied and broadly described herein, there is provided a transparent display apparatus including a display panel and an eyepiece. A linear polarizer is disposed between the display panel and the eyepiece. A polarization control unit is disposed between the linear polarizer and the eyepiece. A refractive index of the eyepiece in a first direction is different from a refractive index of the eyepiece in a second direction perpendicular to the first direction.

The eyepiece may include a plurality of the convex portions being extended in the first direction.

The eyepiece may include a capping layer covering the plurality of the convex portions. A refractive index of the capping layer may be the same as the refractive index of the eyepiece in the second direction.

The display panel may include a first display substrate, a second substrate, and a light-emitting element between the first display substrate and the second substrate.

The polarization control unit may include a first control substrate, a liquid crystal layer and a second control substrate, which are sequentially stacked.

The display panel may include emitting regions and transmitting regions. Each of the transmitting regions may be disposed between the emitting regions. The liquid crystal layer may overlap the emitting regions and the transmitting regions.

The display panel may be driven by a display driver. The polarization control unit may be driven by a polarizing controller. The polarizing controller may control the polarization control unit according to the operation state of the display panel.

The display driver may drive the display panel by a first time for each frame. The first time may be shorter than a second time at which the display panel is not driven in each frame.

The refractive index of the eyepiece in the first direction may be larger than the refractive index of the eyepiece in the second direction.

In another aspect, the transparent display apparatus includes a display panel. The display panel includes a plurality of pixel regions. A linear polarizer is disposed on the display panel. The linear polarizer has a transmission axis in a first direction. A polarization control unit is disposed on the linear polarizer. An eyepiece is disposed on the polarization control unit. A refractive index of the eyepiece in the first direction is larger than a refractive index of the eyepiece in a second direction perpendicular to the first direction. Each of the plurality of pixel regions includes an emitting region and a first transmitting region.

The polarization control unit may include second transmitting regions and polarizing regions. The second transmitting regions may be disposed corresponding to the emitting regions of the display panel. The polarizing regions may be disposed corresponding to the first transmitting regions of the display panel.

The polarization control unit may include a transparent substrate and half-wave patterns. The half-wave patterns may be disposed on the transparent substrate. The half-wave patterns may overlap the polarizing regions.

A micro-lens array may be disposed between the polarization control unit and the eyepiece. A refractive index of the micro-lens array in the first direction may be different from a refractive index of the micro-lens array in the second direction.

BRIEF DESCRIPTION OF THE DRAWINGS

The accompanying drawings, which are included to provide a further understanding of the disclosure and are incorporated in and constitute a part of this application, illustrate aspect(s) of the disclosure and together with the description serve to explain the principle of the disclosure.

In the drawings.

DETAILED DESCRIPTION

Hereinafter, details related to technical configurations and operational effects of the aspects of the present disclosure will be clearly understood by the following detailed description with reference to the drawings, which illustrate some aspects of the present disclosure. Here, the aspects of the present disclosure are provided in order to allow the technical sprit of the present disclosure to be satisfactorily transferred to those skilled in the art, and thus the present disclosure may be embodied in other forms and is not limited to the aspects described below.

In addition, the same or extremely similar elements may be designated by the same reference numerals throughout the specification, and in the drawings, the lengths and thickness of layers and regions may be exaggerated for convenience. It will be understood that, when a first element is referred to as being "on" a second element, although the first element may be disposed on the second element so as to come into contact with the second element, a third element may be interposed between the first element and the second element.

Here, terms such as, for example, "first" and "second" may be used to distinguish any one element with another element. However, the first element and the second element may be arbitrary named according to the convenience of those skilled in the art without departing the technical sprit of the present disclosure.

The terms used in the specification of the present disclosure are merely used in order to describe particular aspects, and are not intended to limit the scope of the present disclosure. For example, an element described in the singular form is intended to include a plurality of elements unless the context clearly indicates otherwise. In addition, in the specification of the present disclosure, it will be further understood that the terms "comprises" and "includes" specify the presence of stated features, integers, steps, operations, elements, components, and/or combinations thereof, but do not preclude the presence or addition of one or more other features, integers, steps, operations, elements, components, and/or combinations.

Unless otherwise defined, all terms (including technical and scientific terms) used herein have the same meaning as commonly understood by one of ordinary skill in the art to which example aspects belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Figure 1:
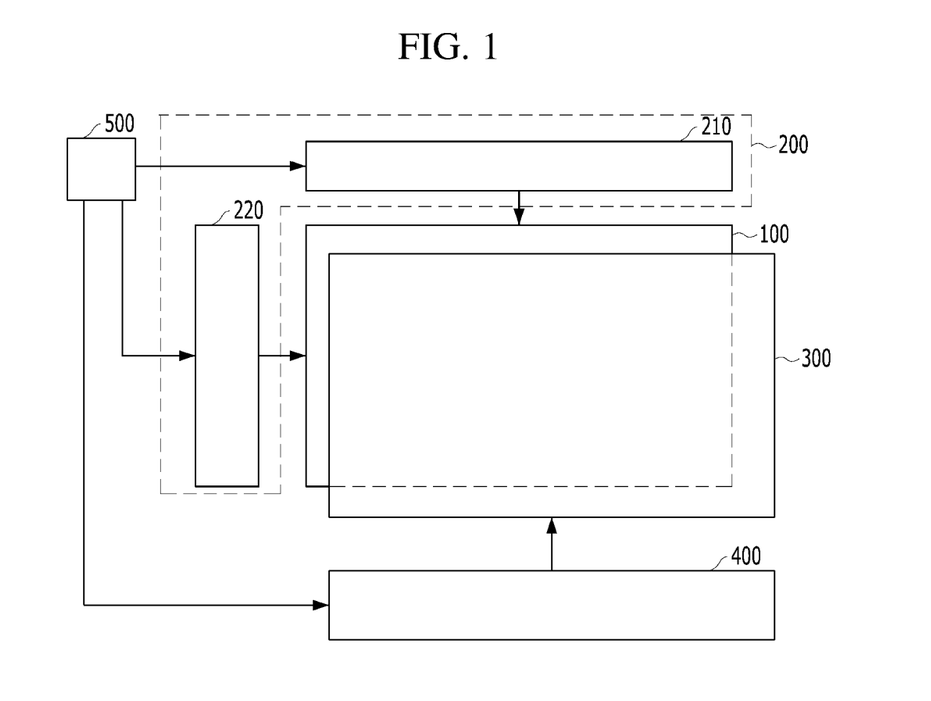
FIGS. 1 and 2 are views schematically showing a transparent display apparatus according to an aspect of the present disclosure.
Figure 2:
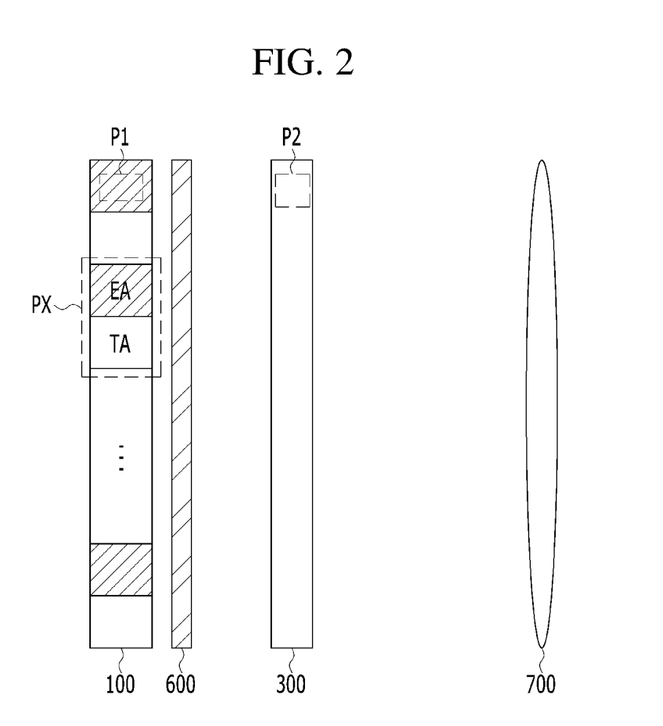
Figure 3:
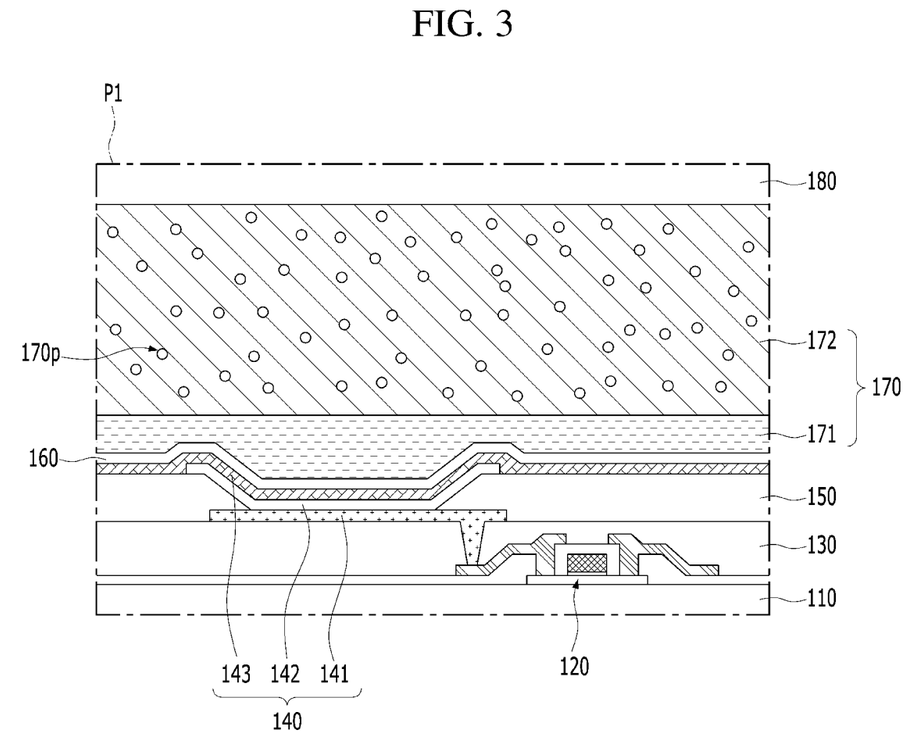
FIG. 3 is an enlarged view of P1 region in FIG. 2.
Figure 4:
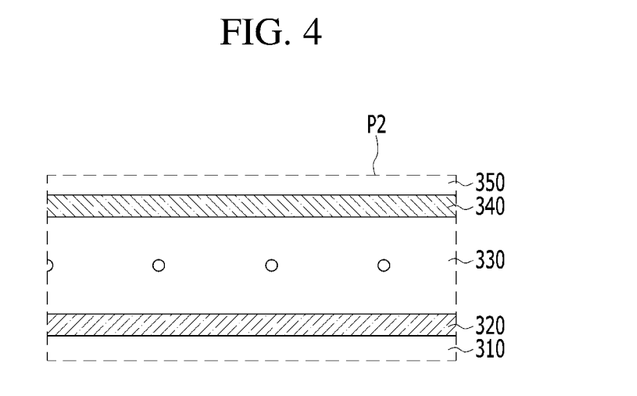
FIG. 4 is an enlarged view of P2 region in FIG. 2.

FIGS. 1 and 2 are views schematically showing a transparent display apparatus according to an aspect of the present disclosure. FIG. 3 is an enlarged view of P1 region in FIG. 2. FIG. 4 is an enlarged view of P2 region in FIG. 2.

Referring FIGS. 1 to 4, the transparent display apparatus according to the aspect of the present disclosure may include a display panel 100. The display panel 100 may realize a specific image. For example, the display panel 100 may include an OLED panel comprising a first display substrate 110, a light-emitting element 140 and a second display substrate 180.

The first display substrate 110 may support the light-emitting element 140. The first display substrate 110 may include an insulating material. The first display substrate 110 may include a transparent material. For example, the first display substrate 110 may include glass or plastic.

The light-emitting element 140 may emit light displaying a specific color. For example, the light-emitting element 140 may include a light-emitting layer 142 between a first display electrode 141 and a second display electrode 143. The light emitted from the light-emitting element 140 may display one of red color, green color, blue color and white color.

The first display electrode 141 may include a conductive material. The first display electrode 141 may include a material having high reflectance. For example, the first display electrode 141 may include a metal, such as aluminum (Al) and silver (Ag). The first display electrode 141 may have a multi-layer structure. For example, the first display electrode may have a structure in which a reflective electrode formed of a material having high reflectance is disposed between transparent electrodes formed of a transparent conductive material, such as ITO and IZO.

The light-emitting layer 142 may generate light having a luminance corresponding to a voltage difference between the first display electrode 141 and the second display electrode 143. For example, the light-emitting layer 142 may include an emission material layer (EML) having an emission material. The emission material may include an inorganic material, an organic material or a hybrid material. The light-emitting layer 142 may have a multi-layer structure. For example, the light-emitting layer 142 may further include at least one of a hole injection layer (HIL), a hole transporting layer (HTL), an electron transporting layer (ETL) and an electron injection layer (EIL).

The second display electrode 143 may include a conductive material. The second display electrode 143 may include a material different from the first display electrode 141. For example, the second display electrode 143 may be a transparent electrode formed of a transparent conductive material, such as ITO and IZO. Thus, in the light-emitting element 140, light generated by the light-emitting layer 142 may be emitted through the second display electrode 143.

A thin film transistor 120 may be disposed between the first display substrate 110 and the light-emitting element 140. The thin film transistor 120 may be turned on/off according to a gate signal applied by a gate line. The light-emitting element 140 may be controlled by the thin film transistor 120. For example, the thin film transistor 120 may apply a driving current corresponding to a data signal applied by a data line to the first display electrode 141 of the light-emitting element 140. The thin film transistor 120 may include a semiconductor pattern, a gate insulating layer, a gate electrode, an interlayer insulating layer, a source electrode and a drain electrode.

An over-coat layer 130 may be disposed between the thin film transistor 120 and the light-emitting element 140. The over-coat layer 130 may remove a thickness difference due to the thin film transistor 120. For example, an upper surface of the over-coat layer 130 opposite to the first display substrate 110 may be a flat surface. The first display electrode 141 of the light-emitting element 140 may be electrically connected to the drain electrode of the thin film transistor 120. For example, the over-coat layer 130 may include an electrode contact hole partially exposing the drain electrode of the thin film transistor 120. The over-coat layer 130 may include an insulating material. For example, the over-coat layer 130 may include an organic insulating material.

A bank insulating layer 150 may be disposed on the over-coat layer 130. The light-emitting element 140 may be independently driven by the bank insulating layer 150. For example, the bank insulating layer 150 may cover an edge of the first display electrode 141. The light-emitting layer 142 and the second display electrode 143 may be stacked on a portion of the first display electrode 141 exposed by the bank insulating layer 150. The light-emitting layer 142 and/or the second display electrode 143 may be extended onto the bank insulating layer 150. The bank insulating layer 150 may include an insulating material. For example, the bank insulating layer 150 may include an organic insulating material. The bank insulating layer 150 may include a material different from the over-coat layer 130.

An upper passivation layer 160 may be disposed on the light-emitting element 140. The upper passivation layer 160 may prevent the damage of the light-emitting element 140 due to the external impact and moisture. For example, the upper passivation layer 160 may cover the entire surface of the second display electrode 143 facing the second display substrate 180. The upper passivation layer 160 may include an insulating material. The upper passivation layer 160 may have a multi-layer structure. For example, the upper passivation layer 160 may have a structure in which an organic layer formed of an organic material is disposed between inorganic layers formed of an inorganic material.

The second display substrate 180 may be disposed on the upper passivation layer 160. The second display substrate 180 may include an insulating material. The second display substrate 180 may include a transparent material. For example, the second display substrate 180 may include glass or plastic. Thus, the light emitted from the light-emitting element 140 may be emitted to the outside through the second display substrate 180.

An adhesive layer 170 may be disposed between the upper passivation layer 160 and the second display substrate 180. For example, the second display substrate 180 may be coupled to the first display substrate 110 in which the light-emitting element 140 is formed, by the adhesive layer 170. The adhesive layer 170 may have a multi-layer structure. For example, the adhesive layer 170 may include a lower adhesive layer 171 and an upper adhesive layer 172, which are sequentially stacked. The upper adhesive layer 172 may include a moisture-absorbing material 170p. The lower adhesive layer 171 may relieve the stress applied to the light-emitting element 140 due to the expansion of the moisture-absorbing material 170p.

The display panel 100 may include a plurality of pixel regions PX. Each of the pixel regions PX may include an emitting region EA and a transmitting region TA. For example, each of the transmitting regions TA may be disposed between the emitting regions EA. The light-emitting element 140 may be disposed in the emitting region EA of the corresponding pixel region PX. The light generated by the light-emitting element 140 may be emitted in the corresponding emitting region EA. The external light may transmit the transmitting region TA of each pixel region PX. Thus, the transparent display apparatus may be recognized as a transparent glass to user when the emitting region EA of each pixel region PX does not emit the light by the light-emitting element 140. Also, in the transparent display apparatus according to the aspect of the present disclosure, the image realized by the light which is emitted by the light-emitting element 140 may be displayed on an image realized by the light passing through the transmitting region TA. That is, in the transparent display apparatus according to the aspect of the present disclosure, a virtual image realized by the display panel 100 and an actual image may be provided to the user, simultaneously.

The display panel 100 may be controlled by a display driver 200. The display driver 200 may provide signals for realizing the image to the display panel 100. For example, the display driver 200 may include a data driver 210 and a scan driver 220.

The data driver 210 may provide the data signal to the display panel 100. The scan driver 220 may sequentially apply the scan signal to the display panel 100. The data signal applied by the data driver 210 may be synchronized with the scan signal applied by the scan driver 220.

A polarization control unit 300 may be disposed on the display panel 100. The light emitted from the display panel 100 may pass through the polarization control unit 300. For example, the polarization control unit 300 may be disposed on the second display substrate 180 of the display panel 100.

The polarizing direction of light passing through the polarization control unit 300 may be changed. For example, the polarization control unit 300 may include a first control substrate 310, a first control electrode 320, a liquid crystal layer 330, a second control electrode 340 and a second control substrate 350, which are sequentially stacked.

The first control substrate 310 and the second control substrate 350 may include an insulating material. The first control substrate 310 and the second control substrate 350 may include a transparent material. For example, the first control substrate 310 and the second control substrate 350 may include glass or plastic. The second control substrate 350 may include a material same as the first control substrate 310.

The first control electrode 320 and the second control electrode 340 may include a conductive material. The first control electrode 320 may be extended along a surface of the first control substrate 310 facing the second control substrate 350. The second control electrode 340 may be extended along a surface of the second control substrate 350 facing the first control substrate 310. For example, the first control electrode 320 and the second control electrode 340 may be a transparent electrode formed of a transparent conductive material, such as ITO and IZO. The second control electrode 340 may include a material same as the first control electrode 320.

The liquid crystal layer 330 may include a liquid crystal rotated according to an electric field formed between the first control electrode 320 and the second control electrode 340. The polarizing direction of the light passing through the liquid crystal layer 330 may be changed according to the rotation state of the liquid crystal in the liquid crystal layer 330. For example, when the liquid crystal in the liquid crystal layer 330 is rotated by the electric field formed between the first control electrode 320 and the second control electrode 340, the polarizing direction of the light passing through the liquid crystal layer 330 may be maintained. The liquid crystal in the liquid crystal layer 330 may be TN mode or ECB mode.

The liquid crystal layer 330 may be extended between the first control electrode 320 and the second control electrode 340. For example, the liquid crystal layer 330 may overlap the emitting regions EA and the transmitting regions TA of the display panel 100. Thus, in the transparent display apparatus according to the aspect of the present disclosure, the polarizing direction of the light emitted from the emitting regions EA of the display panel 100 and/or the polarizing direction of the light passing through the transmitting regions TA of the display panel 100 may be changed, simultaneously.

The polarization control unit 300 may be driven by a polarizing controller 400. For example, the polarizing controller 400 may adjust a voltage applied to the first control electrode 320 and the second control electrode 340 according to the operation state of the display panel 100. The electrical field between the first control electrode 320 and the second control electrode 340 may be formed according to the operation state of the display panel 100. For example, the polarizing controller 400 may be electrically coupled to a timing controller 500 which provides signals for the operation of the data driver 210 and the scan driver 220. Thus, in the transparent display apparatus according to the aspect of the present disclosure, the polarizing direction of the light passing through the polarization control unit 300 when the display panel 100 realizes the image may be different from the polarizing direction of the light passing through the polarization control unit 300 when the display panel 100 does not realizes the image.

A linear polarizer 600 may be disposed between the display panel 100 and the polarization control unit 300. The light traveling toward the polarization control unit 300 from the display panel 100 may pass through the linear polarizer 600. The linear polarizer 600 may have a transmission axis in a first direction, which is a direction parallel to the surface of the display panel 100, for example. For example, the light incident on the polarization control unit 300 may be the light which is linearly polarized in the first direction by the linear polarizer 600. Thus, in the transparent display apparatus according to the aspect of the present disclosure, the light passing through the polarization control unit 300 may be the light linearly polarized in the first direction or the light linearly polarized in a second direction (for example, a direction perpendicular to the surface of the display panel 100) perpendicular to the first direction according to the operation state of the display panel 100.

An eyepiece 700 may be disposed on the polarization control unit 300. The light passing though the polarization control unit 300 may be provided to the user through the eyepiece 700. The eyepiece 700 may be a refractive index anisotropic lens. For example, a refractive index of the eyepiece 700 in the first direction may be different from a refractive index of the eyepiece 700 in the second direction. Thus, the light incident on the eyepiece 700 may be refracted or straightened according to the polarization state of the light. The refractive index of the eyepiece 700 in the first direction may be larger than the refractive index of the eyepiece 700 in the second direction. The moving direction of the light which is linearly polarized in the first direction may be changed by the eyepiece 700. The moving direction of the light which is linearly polarized in the second direction may be not changed.

Figure 5A:
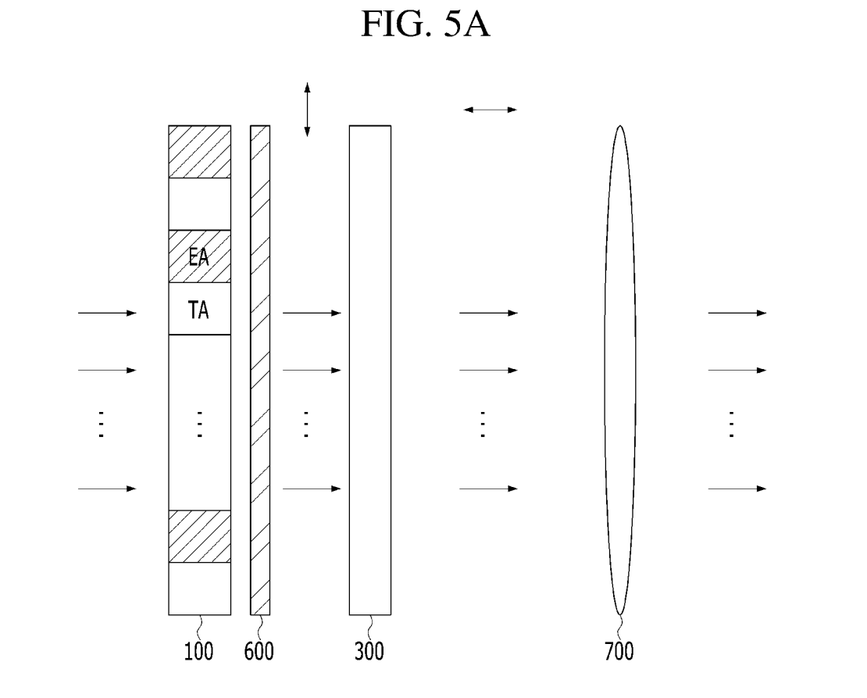
FIGS. 5A and 5B are views showing a polarization state and a path of light according to the operation of the display panel in the transparent display apparatus according to the aspect of the present disclosure.

FIG. 5A is a view showing a polarization state and a path of light when the display panel 100 does not realize the image in the transparent display apparatus according to the aspect of the present disclosure.

Referring to FIG. 5A, when the display panel 100 does not realize the image, the light incident on the polarization control unit 300 may be the light passing the transmitting regions TA of the display panel 100. The light traveling toward the polarization control unit 300 from the display panel 100 may be linearly polarized in the first direction by the linear polarizer 600. Since the display panel 100 is not operated, the electric field is not formed between the first control electrode 320 and the second control electrode 340. Thus, the light which is linearly polarized in the first direction by the linear polarizer 600 may be linearly polarized in the second direction by the polarization control unit 300.

The light which is linearly polarized in the second direction by the polarization control unit 300 may be not refracted by the eyepiece 700. Thus, the light passing through the transmitting regions TA of the display panel 100 may be provided to the user through the shortest distance from the eyepiece 700. That is, in the transparent display apparatus according to the aspect of the present disclosure, when the virtual image is not realized by the display panel 100, the actual image may be provided to the user without the distortion due to the refraction of the light.

Figure 5B:
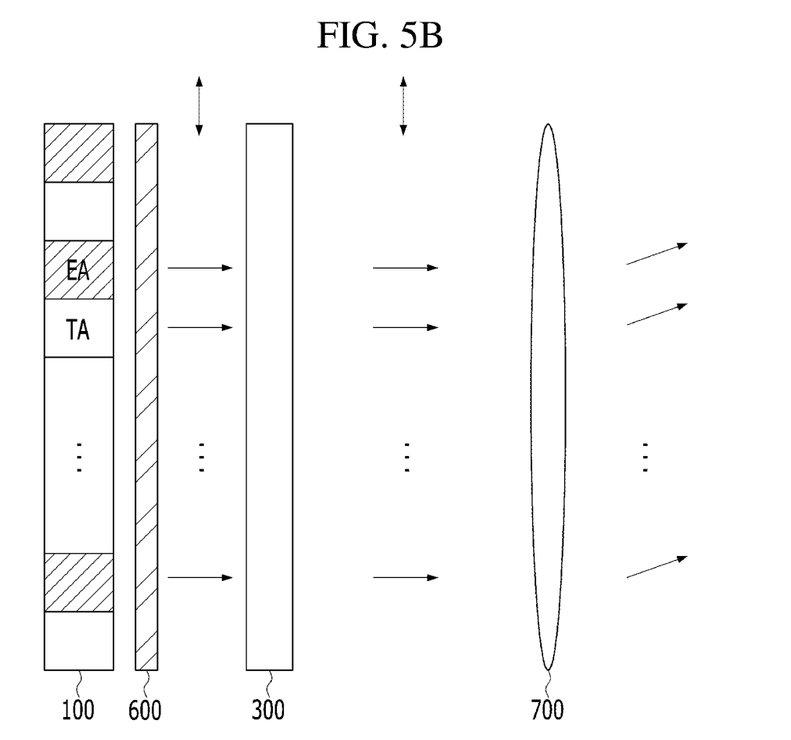

FIG. 5B is a view showing a polarization state and a path of light when the display pane 100 realize the image in the transparent display apparatus according to the aspect of the present disclosure.

Referring to FIG. 5B, when the display panel 100 realize the image, the light emitted from the emitting regions EA of the display panel 100 may be incident on the linear polarizer 600. Since the display panel 100 is driven, the electric field may be formed between the first control electrode 320 and the second control electrode 340 of the polarization control unit 300. The liquid crystal in the liquid crystal layer 330 of the polarization control unit 300 may be rotated by the electric field formed between the first control electrode 320 and the second control electrode 340. Thus, the light which is linearly polarized in the first direction by the linear polarizer 600 may pass through the polarization control unit 300 without the change of the polarizing direction. That is, the light traveling toward the eyepiece 700 after passing through the polarization control unit 300 may be the light linearly polarized in the first direction.

The light linearly polarized in the first direction which passes through the polarization control unit 300 may be refracted by the eyepiece 700. Thus, the light emitted from the emitting regions EA of the display panel 100 may be refracted by the eyepiece 700 and provided to the user. That is, in the transparent display apparatus according to the aspect of the present disclosure, the light emitted from the emitting regions EA of the display panel 100 for realizing the virtual image may have a path longer than the light provided to the user when the virtual image is not realized.

Accordingly, the transparent display apparatus according to the aspect of the present may relatively increase the path of the light emitted from the emitting regions EA of the display panel 100 to realize the virtual image using the polarization control unit 300 and the eyepiece 700 which is a refractive index anisotropic lens. Thus, the transparent display apparatus according to the aspect of the present disclosure may sufficiently secure the path of the light for realizing the virtual image. Therefore, in the transparent display apparatus according to the aspect of the present disclosure, the quality of the image realized by the display panel 100 may be increased. Also, in the transparent display apparatus according to the aspect of the present disclosure, the viewing angle of the virtual image may be increased.

Figure 6:
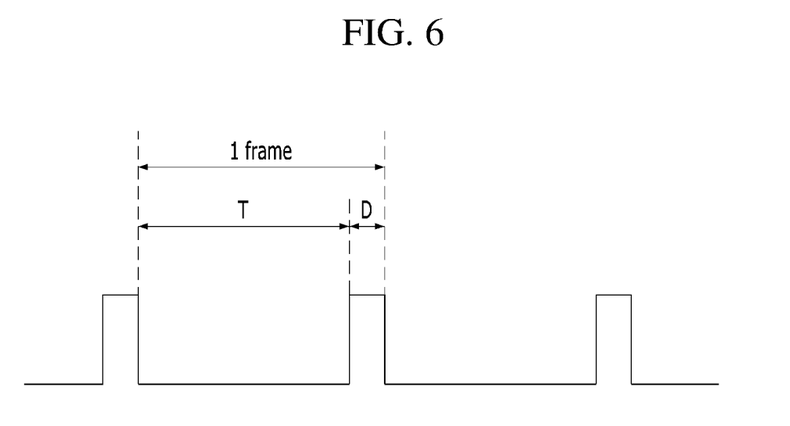
FIG. 6 is a view showing an operation time of the display panel in the transparent display apparatus according to the aspect of the present disclosure.

In the transparent display apparatus according to the aspect of the present disclosure, the light passing through the transmitting regions TA of the display panel 100 may be provided to the user with the virtual image realized by the display panel 100. That is, in the transparent display apparatus according to the aspect of the present disclosure, the actual image realized by the light which is refracted by the eyepiece 700 may be provided to the user with the virtual image realized by the display panel 100. In the transparent display apparatus according to the aspect of the present disclosure, the time D that the virtual image is provided to the user may be shorter than the time T that the actual image is provided to the user without the virtual image in each frame, as shown in FIG. 6. For example, in the transparent display apparatus according to the aspect of the present disclosure, the display driver 200 may adjust the first time D that the display panel 100 is driven for each frame, so that the first time D is shorter than the second time T that the display panel 100 is not driven for each frame. Thus, the transparent display apparatus according to the aspect of the present disclosure may prevent the deterioration of the actual image by the light which is simultaneously provided to the user with the virtual image, and refracted by the eyepiece 700. Therefore, in the transparent display apparatus according to the aspect of the present disclosure, the actual image and the virtual image may be provided to the user, clearly.

Figure 7:
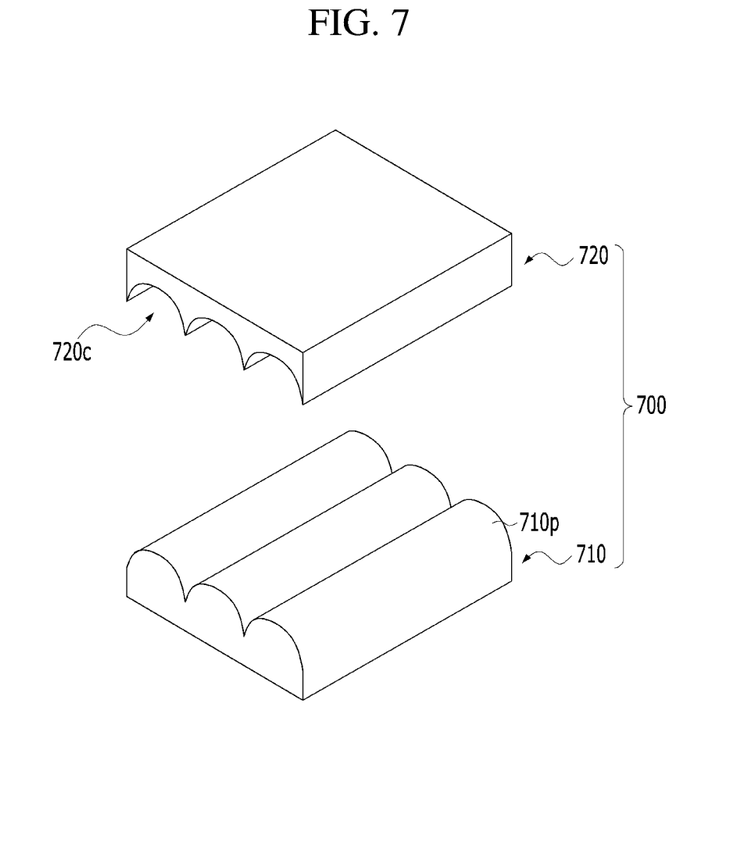
FIGS. 7 to 10 are views respectively showing the transparent display apparatus according to another aspect of the present disclosure.

The transparent display apparatus according to the aspect of the present disclosure is described that the eyepiece 700 is a single lens have a refractive index in the first direction different from a refractive index in the second direction. However, the transparent display apparatus according to another aspect of the present disclosure may include a various types of the eyepiece 700 having a refractive index anisotropic. For example, in the transparent display apparatus according to another aspect of the present disclosure, the eyepiece 700 may include a birefringence lens 710 having a plurality of convex portions 710*p*, and a capping layer 720 covering the plurality of convex portions 710*p* of the birefringence lens 710, as shown in FIG. 7. The plurality of convex portions 710*p* may be extended in a direction. A refractive index in the direction in which the plurality of the convex portions 710*p* is extended may be larger than a refractive index in the direction perpendicular to the direction in which the plurality of the convex portions 710*p* is extended. For example, a refractive index of the capping layer 720 may be the same as the refractive index in the direction perpendicular to the direction in which the plurality of the convex portions 710*p* is extended. Thus, in the transparent display apparatus according to another aspect of the present disclosure, the cost for forming the eyepiece 700 having refractive index anisotropic may be reduced. Therefore, in the transparent display apparatus according to another aspect of the present disclosure, the quality and the viewing angle of the virtual image, and the production efficiency may be improved.

Figure 8:
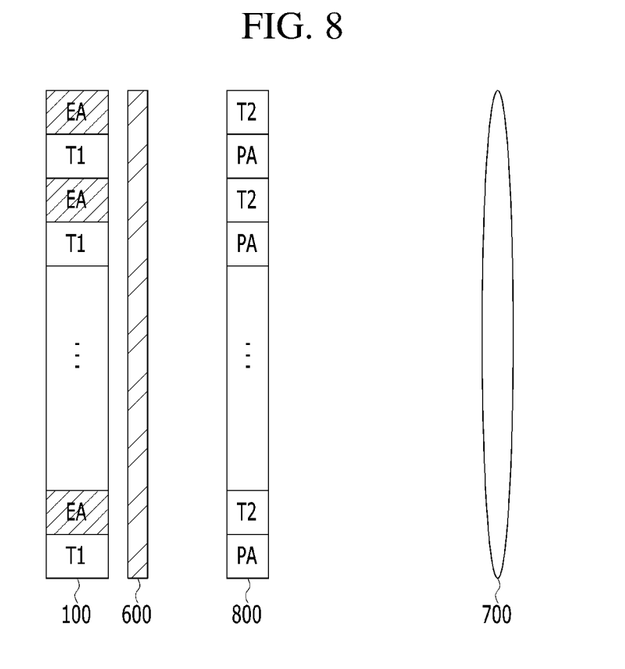
Figure 9:
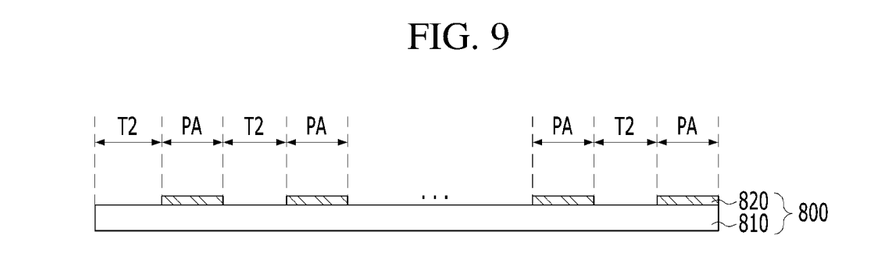

The transparent display apparatus according to the aspect of the present disclosure is described that the polarization state of the light passing through the linear polarizer 600 is changed by the polarization control unit 300, simultaneously. However, in the transparent display apparatus according to another aspect of the present disclosure, the polarization state of the light passing through the polarization control unit 800 may be changed in region-by-region, as shown in FIG. 8. For example, in the transparent display apparatus according to another aspect of the present disclosure, the display panel 100 may include the emitting regions EA and first transmitting regions T1, and the polarization control unit 800 may include second transmitting regions T2 and polarizing regions PA, as shown in FIG. 8. The second transmitting regions T2 of the polarization control unit 800 may be disposed corresponding to the emitting regions EA of the display panel 100. The polarizing regions PA of the polarization control unit 800 may be disposed corresponding to the first transmitting regions T1 of the display panel 100. For example, the polarization control unit 800 may include a transparent substrate 810 and half-wave patterns 820 on the transparent substrate 810, as shown in FIG. 9. The half-wave patterns 820 may overlap the polarizing regions PA. Thus, in the transparent display apparatus according to another aspect of the present disclosure, only the polarization state of the light passing the first transmitting regions T1 of the display panel 100 may be changed by the polarization control unit 800. That is, in the transparent display apparatus according to another aspect of the present disclosure, the distortion and/or the deterioration of the actual image which is simultaneously provided with the virtual image may be prevented. Therefore, in the transparent display apparatus according to another aspect of the present disclosure, the quality and the viewing angle of the virtual image provided to the user may be increased, and the method for operating the display panel 100 and the polarization control unit 300 may be simplified.

Figure 10:
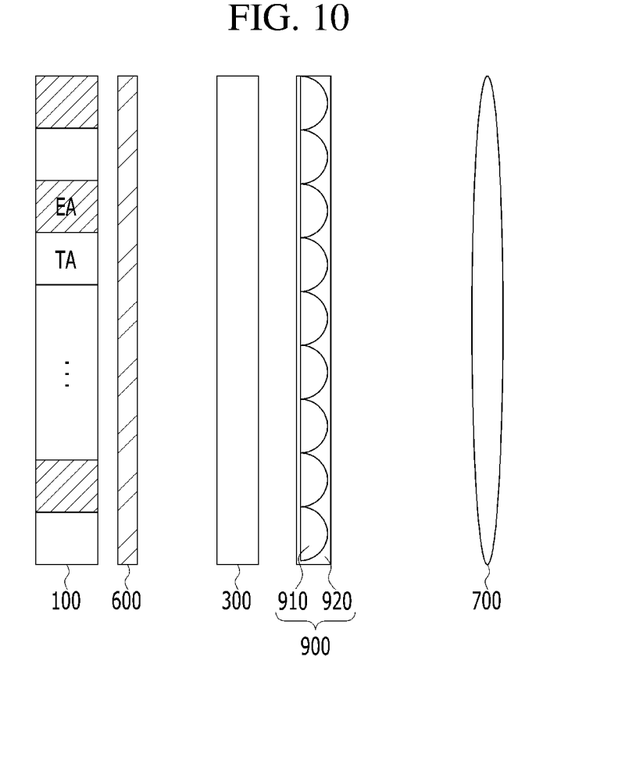

The transparent display apparatus according to the aspect of the present disclosure is described that the light passing through the polarization control unit 300 is incident on the eyepiece 700. However, the transparent display apparatus according to another aspect of the present disclosure may realize a stereoscopic image using light field technology. For example, the transparent display apparatus according to another aspect of the present disclosure may further include a micro-lens array 900 between the polarization control unit 300 and the eyepiece 700, as shown in FIG. 10. A refractive index of the micro-lens array 900 in the first direction may be different from a refractive index of the micro-lens array 900 in the second direction perpendicular to the first direction. For example, the micro-lens array 900 may include a plurality of birefringence lens 910 and a passivation layer 920 covering the plurality of the birefringence lens 910. The passivation layer 920 may include an insulating material. For example, the passivation layer 920 may include silicon oxide and/or silicon nitride. Thus, in the transparent display apparatus according to another aspect of the present disclosure, the location of the virtual image provided to the user may be determined by the arrangement and the light axis of the plurality of the birefringence lens 910. Therefore, in the transparent display apparatus according to another aspect of the present disclosure, the location of the virtual image which is realized by the display panel 100 and provided to the user may be variable.

In the result, the transparent display apparatus according to the aspects of the present disclosure may selectively increase the path of the light emitted from the display panel by using the polarization control unit and the eyepiece. Thus, in the transparent display apparatus according to the aspects of the present disclosure, the path of the light emitted from the display panel may be longer than the path of the light passing through the display panel. Thereby, in the transparent display apparatus according to the aspects of the present disclosure, the quality and the viewing angle of the image realized by the display panel which is realized on an image formed by the light passing through the display panel may be improved.

What is claimed is:

1. A transparent display apparatus comprising:
a display panel including light-emitting elements between a first display substrate and a second display substrate;
a display driver driving the light-emitting elements of the display panel by a first time during each frame;
an eyepiece on the display panel, the eyepiece having a refractive index in a first direction different from a refractive index of the eyepiece in a second direction which is perpendicular to the first direction;
a linear polarizer disposed between the display panel and the eyepiece; and
a polarization control unit disposed between the linear polarizer and the eyepiece,
wherein the display panel includes a plurality of pixel regions, each of the pixel regions including an emitting region in which one of the light-emitting elements is disposed, and a transmitting region adjacent to the emitting region, and
wherein the first time is shorter than a second time at which the light-emitting elements of the display panel are not driven during each frame.

2. The transparent display apparatus according to claim 1, wherein the eyepiece includes a plurality of convex portions extended in the first direction.

3. The transparent display apparatus according to claim 2, wherein the eyepiece further includes a capping layer covering the plurality of the convex portions, and
wherein the capping layer has a refractive index the same as the refractive index of the eyepiece in the second direction.

4. The transparent display apparatus according to claim 1, wherein each of the light-emitting elements includes a light-emitting layer between a first display electrode and a second display electrode.

5. The transparent display apparatus according to claim 1, wherein the polarization control unit includes a first control substrate, a liquid crystal layer and a second control substrate, which are sequentially stacked.

6. The transparent display apparatus according to claim 5, wherein the liquid crystal layer overlaps the emitting regions and the transmitting regions.

7. The transparent display apparatus according to claim 5, further comprising:
a polarizing controller driving the polarization control unit,
wherein the polarizing controller controls the polarization control unit according to an operation state of the display panel.

8. The transparent display apparatus according to claim 7, wherein the refractive index of the eyepiece in the first direction is greater than the refractive index of the eyepiece in the second direction.

9. A transparent display apparatus comprising:
a display panel including a plurality of pixel regions;
a linear polarizer disposed on the display panel and having a transmission axis in a first direction;
a polarization control unit disposed on the linear polarizer; and
an eyepiece disposed on the polarization control unit and having a refractive index in the first direction greater than a refractive index of the eyepiece in a second direction perpendicular to the first direction,
wherein each of the plurality of pixel regions includes an emitting region in which a light-emitting element is disposed and a first transmitting region adjacent to the emitting region, and
wherein a first time at which the light-emitting elements of the display panel are driven during each frame is shorter than a second time at which the light-emitting elements of the display panel are not driven during each frame.

10. The transparent display apparatus according to claim 9, wherein the polarization control unit includes second transmitting regions corresponding to the emitting regions of the display panel, and polarizing regions corresponding to the first transmitting regions of the display panel.

11. The transparent display apparatus according to claim 10, wherein the polarization control unit includes a transparent substrate and half-wave patterns on the transparent substrate, and
wherein the half-wave patterns overlap the polarizing regions.

12. The transparent display apparatus according to claim 9, further comprising a micro-lens array between the polarization control unit and the eyepiece,
wherein the micro-lens array has a refractive index in the first direction different from a refractive index of the micro-lens array in the second direction.

13. A transparent display apparatus comprising:
a display panel having first and second display substrates and light-emitting elements between the first and second display substrates;
an eyepiece including a plurality of convex portions extended in a first direction and a capping layer covering the plurality of the convex portions;
a linear polarizer disposed between the display panel and the eyepiece; and a polarization control unit disposed between the linear polarizer and the eyepiece and including a first control substrate, a liquid crystal layer and a second control substrate, which are sequentially stacked,
wherein the eyepiece has a refractive index in a first direction different from a refractive index of the eyepiece in a second direction which is perpendicular to the first direction, and
wherein the display panel includes emitting regions in which the light-emitting elements are disposed, and transmitting regions disposed between the emitting regions, and
wherein the light-emitting elements of the display panel are driven by a first time during each frame, and the first time is shorter than a second time at which the light-emitting elements of the display panel are not driven during each frame.

14. The transparent display apparatus according to claim 13, wherein the capping layer has a refractive index the same as the refractive index of the eyepiece in the second direction.

15. The transparent display apparatus according to claim 13, wherein an image by the light-emitting elements on the emitting regions of the display panel is provided to a user simultaneously with an image realized by light passing through the transmitting regions of the display panel.

16. The transparent display apparatus according to claim 13, wherein the liquid crystal layer overlaps the emitting regions and the transmitting regions.

17. The transparent display apparatus according to claim 13, further comprising:
a display driver driving the light-emitting elements of the display panel; and
a polarizing controller driving the polarization control unit,
wherein the polarizing controller controls the polarization control unit according to an operation state of the display panel.

18. The transparent display apparatus according to claim 13, wherein the refractive index of the eyepiece in the first direction is greater than the refractive index of the eyepiece in the second direction.

* * * * *